UNITED STATES PATENT OFFICE.

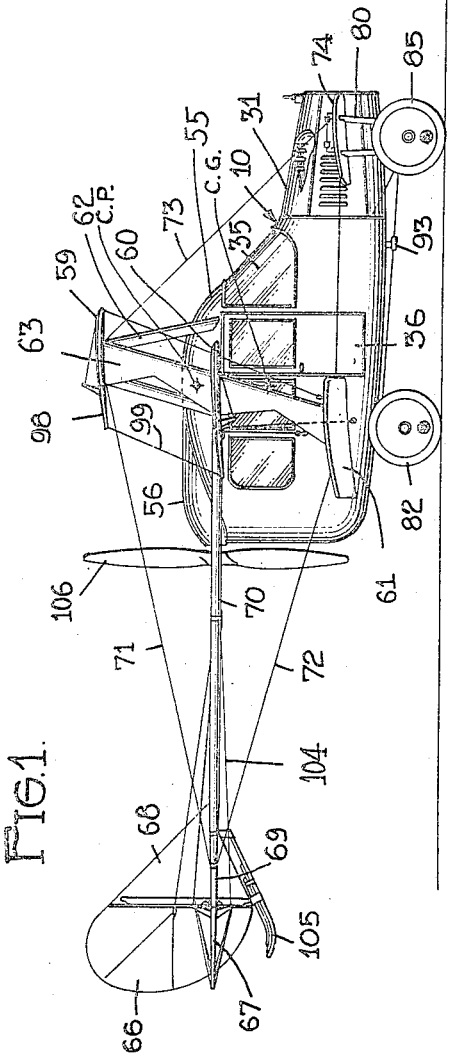

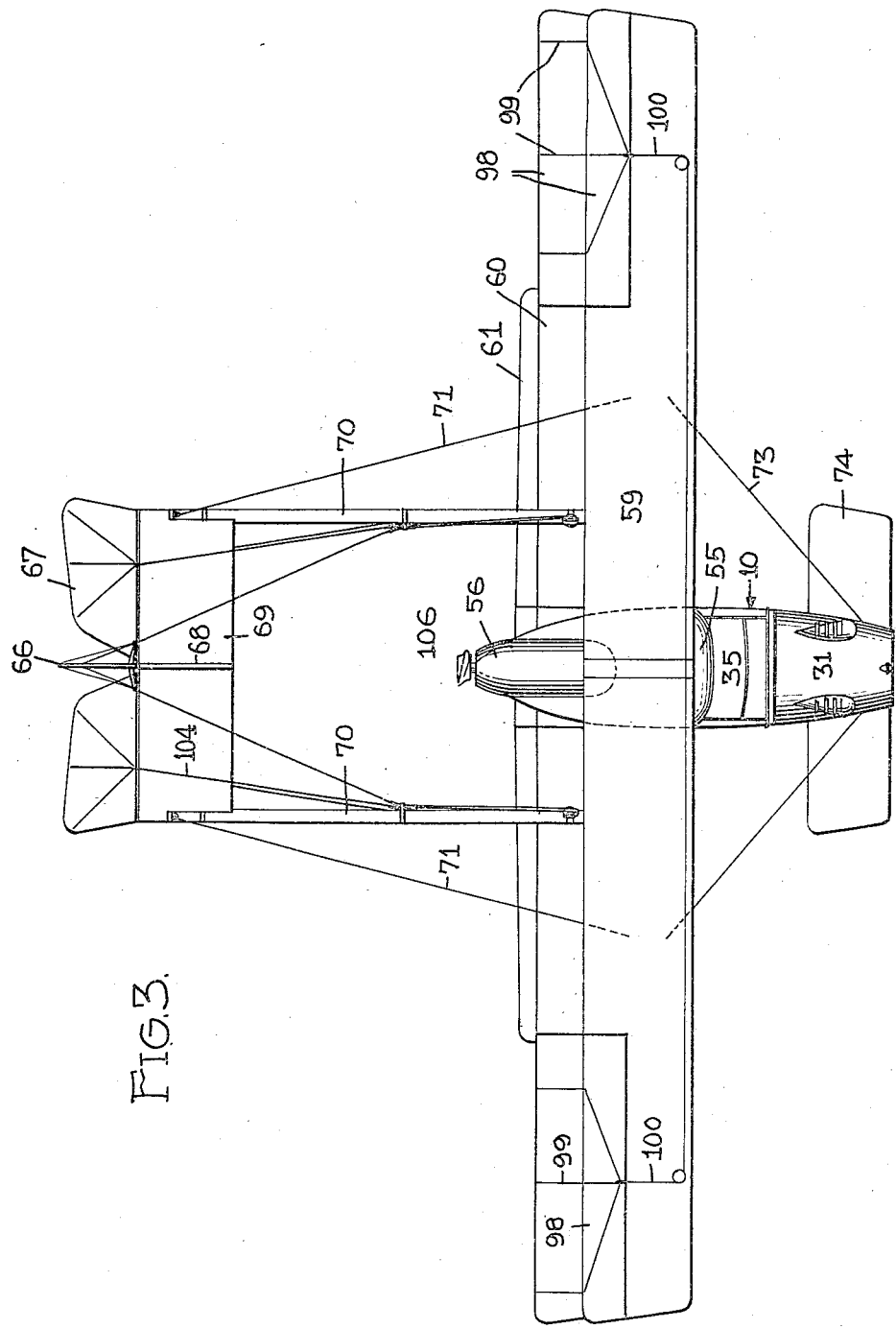

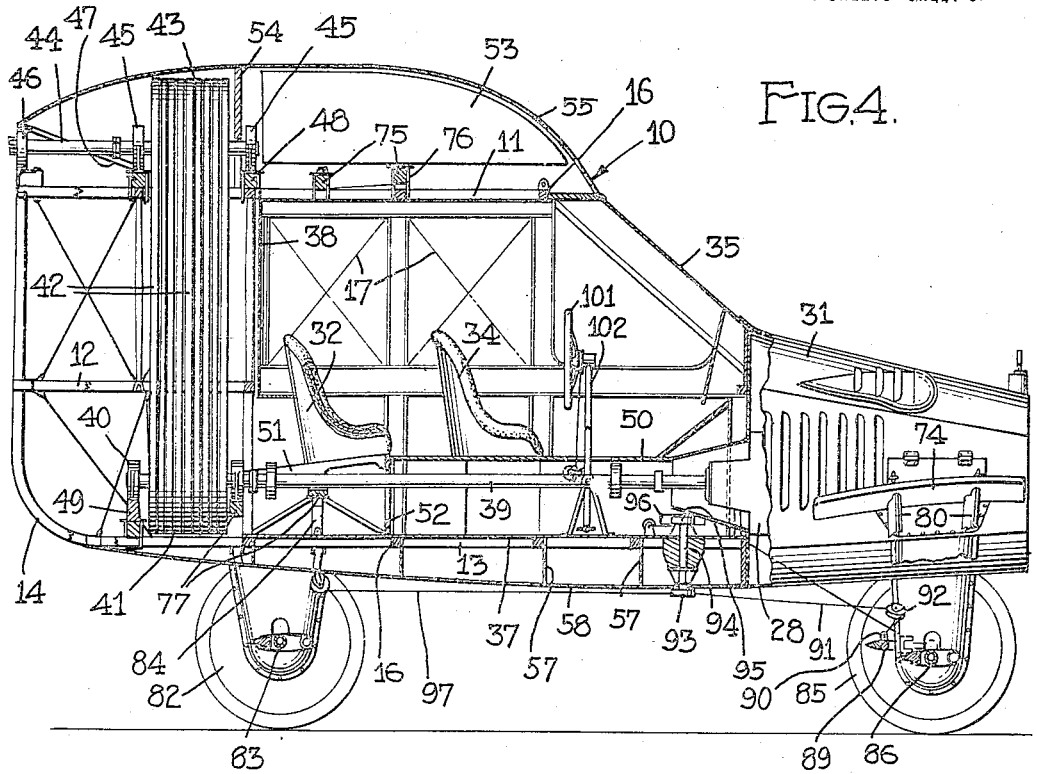
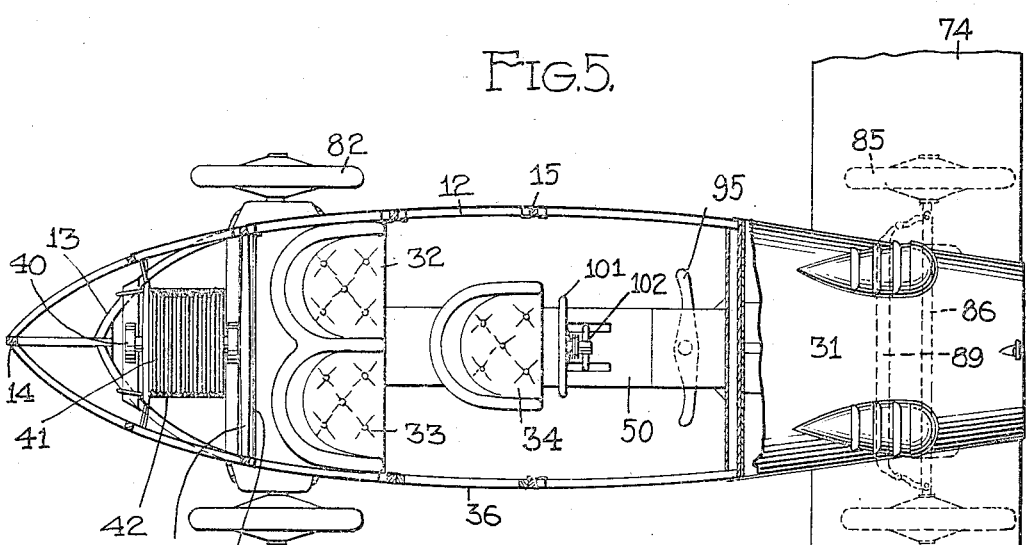
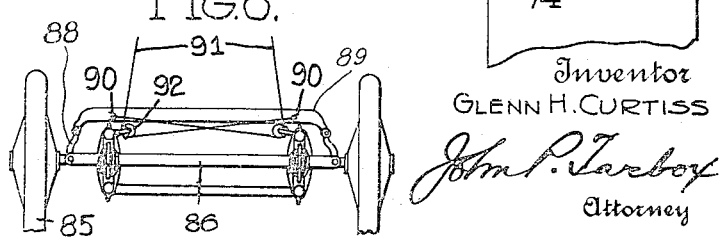

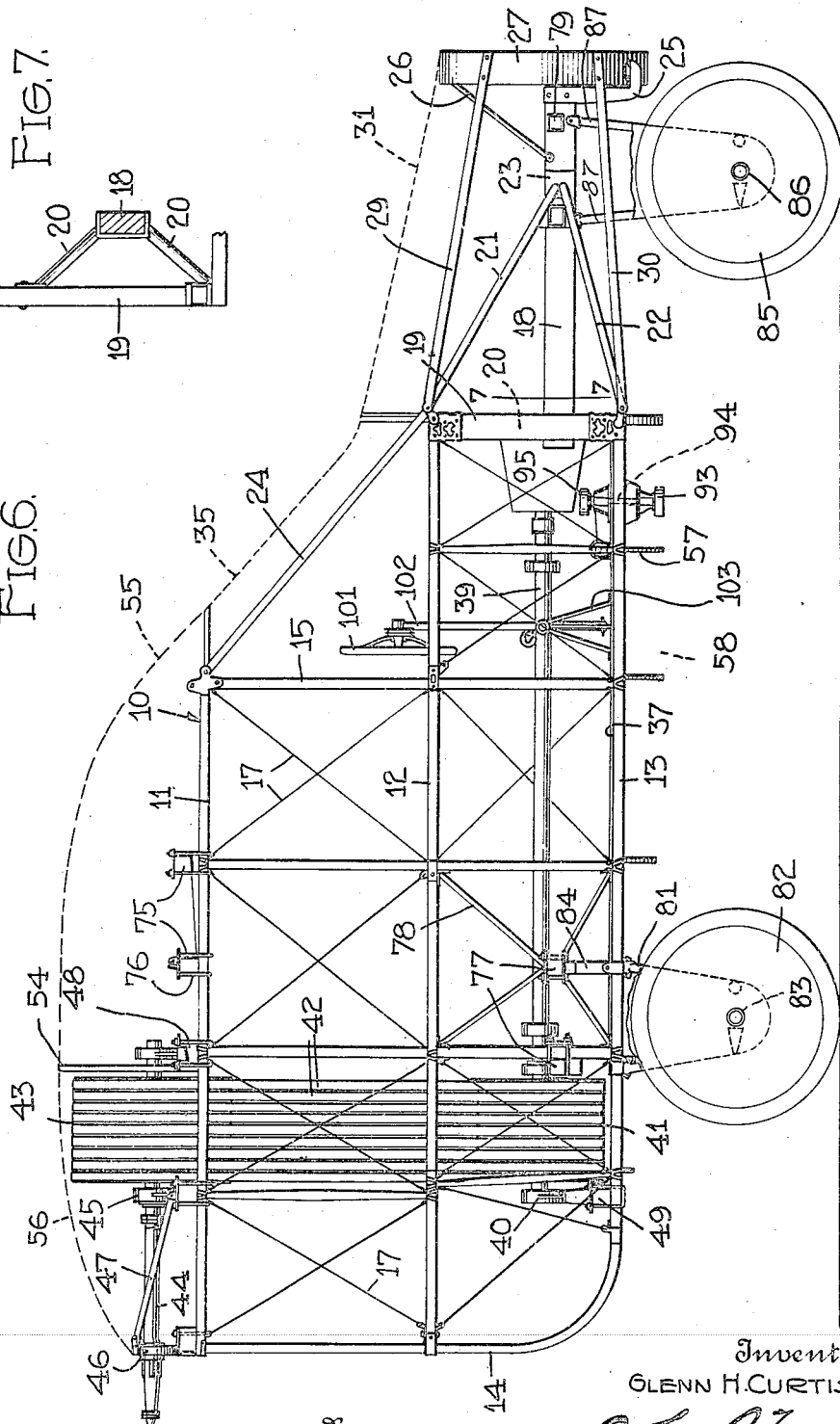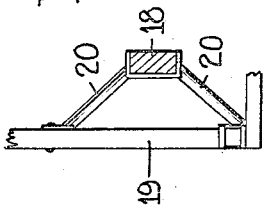

GLENN H. CURTISS, OF BUFFALO, NEW YORK, ASSIGNOR TO CURTISS AEROPLANE AND MOTOR CORPORATION, OF BUFFALO, NEW YORK, A CORPORATION OF NEW YORK.

AUTOPLANE.

1,294,413.  Specification of Letters Patent.  Patented Feb. 18, 1919.

Application filed February 14, 1917. Serial No. 148,506.

*To all whom it may concern:*

Be it known that I, GLENN H. CURTISS, a citizen of the United States, residing at Buffalo, in the county of Erie and State of New York, have invented certain new and useful Improvements in Autoplanes, of which the following is a specification.

My invention relates to aircraft, and has reference more particularly to improvements in aerial vehicles of the "autoplane" type.

In machines of passenger carrying capacity the question of weight distribution and passenger accommodation is important, especially since proper longitudinal balance and comfort must be co-incidently considered. The usual type of land machine is equipped with seats arranged in tandem or seats arranged side by side. Only in very rare instances has there been constructed a practical machine in which accommodation for more than two is provided. Another serious objection to the type of machines now existing is that no provision is made for the housing of the occupants. The usual fuselage or nacelle is characterized by an absence of conveniences and equipment, especially necessary for comfort and pleasure during flight in cold or inclement weather. Both the pilot and passengers are partly, if not entirely, exposed, and body movements of the crew or occupants seemingly unnecessarily restricted. Speed and not comfort seems to have been the prime desideratum in the design of aeroplanes heretofore. As a commercial and pleasure craft the aeroplane has been under-developed. The demand for military machines overwhelmingly directed development along that line.

This invention, however, aims to overcome the defects and objectionable features above pointed out and instead provide what may be termed a combined social and tandem seater, that is, a machine having its seats arranged not only one in advance of the other, but also side by side. As a pleasure craft the invention seeks to introduce into the aeronautical art the many comforts and conveniences now present in the automobile art.

In lieu of the fuselage or nacelle the body of the craft is constructed in sedan or coupé style, both passengers and pilot being completely inclosed and protected. Two sets of longitudinally separated independently acting landing gear wheels are provided. Each set is equipped with shock absorber elastics, the forward wheels being hereinafter referred to as the steering wheels. Directly over the forward steering wheels the power plant or motor is disposed and aft of the motor is arranged the passenger carrying compartment of the sedan body. The rear landing gear wheels underlie said body. Since the machine is of the pusher type with the propeller mounted directly aft of the body and the propeller axis in a plane considerably above the plane of the fore and aft axis of the motor, said shaft extends rearwardly from the motor, through the body, beneath the pilot's seat, and between the passengers' seats, terminating aft within said body adjacent its after end. A multiple number of belts transmit power from said shaft to the propeller or drive shaft which is comparatively short and mounted as intimated above and at the extreme rear end of said body. By this arrangement the plane of revolution of the propeller is sufficiently removed from the ground to avoid contact therewith and this without correspondingly elevating the motor. A fuel tank is built into the top of the body and in the vertical plane of the center of gravity, said body with the tank inclosed, being effectually stream lined throughout.

Triplane wings characterize the machine. The intermediate wings extend right and left from the body adjacent its top, the upper wings right and left from a point above said top, and the lower wings right and left from the body adjacent the rear landing gear wheels. These wings, together with auxiliary stub wings, mounted in the vicinity of the forward landing gear wheels, constitute the total supporting surface area of the craft. The wing beams of the lower and intermediate wings of the triplane structure are of the built-in type, also the wing beams of the auxiliary wings. The resultant center of aeroplane lift is thus brought forward to lie approximately in the transverse vertical plane of the center of gravity. Perfect balance is in this way obtained.

The empennage of the craft is supported out from the rear end of the sedan body by outriggers or spars extending rearwardly from the intermediate wings, one at each side of both the propeller and said body. The details of the various parts herein enumerated will be referred to more particularly as the description proceeds. Of the drawings;

Figure 1 is a side elevation of my improved aerial vehicle or autoplane,

Fig. 2 is a front end elevation,

Fig. 3 is a top plan view,

Fig. 4 is a longitudinal vertical sectional view of the sedan body,

Fig. 5 is a horizontal sectional view of said body,

Fig. 6 is an assembly view in side elevation, of said body,

Fig. 7 is a section on the line 7—7 of Fig. 6, and

Fig. 8 is a top plan view of the connecting rod leads of the steering mechanism.

In the embodiment of the invention selected for illustration 10 designates in its entirety the sedan body, said body in side elevation having lines quite similar to the now used limousine or sedan type of automobile. Three, instead of two, sets of longerons characterize the body, the upper longerons being designated as 11, the intermediate longerons as 12 and the lower longerons as 13. The intermediate and lower longerons extend forwardly considerably beyond the plane of the forward end of the upper longerons 11 and the said lower longerons 13 terminate rearwardly in a plane forwardly removed from the plane of the rear end of the intermediate and upper longerons 12 and 11. The corresponding longerons of the intermediate and upper longerons are parallel throughout. In each instance said longerons are bowed in a horizontal plane (see Fig. 5) to intersect or meet at their rearward end. The lower longerons although horizontally bowed, do not intersect in the vertical plane of the point of intersection of the upper and intermediate longerons, the point of intersection of the lower longerons being forwardly removed. There is thus evolved in plan an aeroplane body of effectual streamline fore and aft, said body, in cross section, having its greatest width somewhat in advance of its vertical axis, the width, rearwardly from the transverse vertical plane of said axis, tapering to an edge at the extreme after end. The lower longerons 13 are continued or prolonged rearwardly and upwardly for securement by appropriate means to the intermediate and upper longerons, a stern post 14 curved downwardly and forwardly at its lower end, being utilized for that purpose.

Appropriate vertically and horizontally extending body struts 15 and 16 and tie wires 17 cross arranged in intersecting planes interbrace the longerons from end to end and form therewith the skeleton of the sedan body. For maximum strength the vertical body struts 15 interconnecting respectively the upper and the intermediate and the intermediate and lower longerons are alined.

Engine bed beams 18 are arranged to extend forwardly beyond the corresponding end of the sedan body. Said beams at their rearward ends are supported between extra heavy fuselage struts 19 equipped with inwardly extending and inwardly converging supports 20 of a construction illustrated to advantage in Fig. 7. The beams 18 at their forward ends are supported by braces 21 and 22 arranged in pairs, the braces 21 extending forwardly and downwardly in continuation of the intermediate longerons 12 and the braces 22 forwardly and upwardly in continuation of the lower longerons 13. The corresponding braces of each pair extend inwardly to conjointly support fittings 23 which partly embrace the respective engine bed beams. Said beams 18 are also braced to the upper longerons 11 by means of braces 24. These braces interconnect respectively the longerons 11 and longerons 12 in continuation of the braces 21, the latter being disposed preferably at approximately a 45 degree angle to the horizontal whereby the forward streamlines of the sedan body are produced.

Radiator supports 25 are dropped down from the forward ends of the beams 18 to function with braces 26 as the supporting means for the radiator 27 of the power plant. The motor of the power plant I have designated in its entirety by the numeral 28. Longitudinally extending metallic strips 29 and 30 brace the radiator and at the same time support the hood of the motor herein designated 31. If desired, the hood 31 may be made removable in much the same manner as the hood of an automobile engine. Access to the motor is thus obtained.

Interiorly the sedan body is equipped with seats 32, 33 and 34. The seats 32 and 33 are arranged side by side and symmetrically with respect to the fore and aft axes of the craft and the seat 34 in advance of the seats 32 and 33, the latter lying substantially directly above said axis. All seats are entirely and completely inclosed within the sedan body which, to effectually protect the pilot and the passengers against the elements, is completely inclosed. It is also interiorly finished for ease and comfort during flight. Celluloid 35 is used rather than glass at points where transparency is desired. At one side of the sedan body (or both sides if desired) a door 36 is provided. Said door opens outwardly preferably in the plane of the forward seat 34.

The flooring 37 of the sedan body is fastened directly to the lower horizontally extending body struts 16 and extends preferably from the engine section rearwardly to a point beneath a partition 38 arranged to transversely divide the body into separate compartments. The intermediate compartment affords accommodation for the pilot and passengers and the rear compartment space for at least a portion of the transmission means. Other appropriate interior equipment common to the limousine and sedan types of automobiles may be installed.

The low location of the motor 28 obviously necessitates that the propeller axis be elevated above the horizontal plane of the axis of the motor crank shaft 39. The crankshaft it will be noted extends rearwardly from the motor through the sedan body, bearings 40 being provided therefor. Said shaft 39 terminates rearwardly beyond the vertical plane of the partition 38 to support aft of said partition a relatively wide pulley 41, the periphery of which is circumferentially grooved. These grooves extend parallel and each is designed to receive one of a plurality of transversely corrugated leather belts 42, the belts collectively constituting an appropriate belt drive of unusual strength, lightness and reliability. A second and relatively wide pulley 43 is mounted directly above the pulley 41, the axis of rotation of the pulley 43 extending parallel to the axis of the pulley 41. Said pulley 43 is mounted upon the drive or propeller shaft 44. The bearings for the propeller shaft I have designated 45 and 46. The bearing 46 is disposed rearmost and in the vertical plane of the stern post 14 directly over which it is disposed. Forwardly extending braces 47 brace said bearing 46. Extra heavy cross or body struts 48 and 49 support the bearings 40 and 45 since it is at this point that the strain is imposed upon the body of the craft during operation in the air. In this connection it will also be noted that the intermediate longerons 12 are cross braced only in the vicinity of the belting 42 and at their extreme forward end.

A covering 50 for that portion of the shaft 39 extending through the sedan body is provided. This covering is preferably rectangular in cross section and of sufficient size and strength to serve as a support for the forward or pilot's seat 34 and as a brace for the rear seats 32 and 33, although the latter are equipped with supporting seat rails 51 and a supporting diaphragm 52. Said covering 50 is symmetrical about the longitudinal axis of the craft and so arranged with respect to the seats 32, 33 and 34 as to in no way interfere with the foot and leg space of the occupants.

Above the sedan body and streamlined as a unit therewith I have located the fuel tank 53, the center of the tank lying approximately in the transverse vertical plane of the center of gravity of the craft designated CG. A partition 54 divides the tank space from that space occupied by the pulley 43. Said partition also functions as a brace or support for the streamlined covering 55. This covering 55 is preferably of light sheet metal although doped fabric with a supporting framework of wood may be used. For a decrease in resistance incident to flight that portion of the covering 55 at opposite sides of the shaft 44 may be perfectly streamlined, thus leaving a mid-section 56 of less perfect streamline within which the pulley 43 and the shaft 44 are inclosed. The covering formation is illustrated advantageously in Figs. 1 and 3.

To increase the effective streamline of the bottom of the sedan body 10 floor frames 57 are provided. These frames are of successively decreasing depth from the forward end of the body aft and together constitute a supporting framework for the metallic bottom covering 58 of the craft. This covering 58 like the covering 55, may be constructed of wood and fabric. The floor frames 57 preferably underlie the horizontal cross struts 16, said covering, however, continuing forward beneath the engine section of the body without a break in the continuity of said covering from the forward end aft.

Aeroplane wings extending out laterally from the vertical plane of the fore and aft axis of the craft constitute together a triplane structure, the upper plane 59 and the intermediate plane 60 of which have a greater spread or span than the lower plane 61. The wings of the upper plane extend right and left from the apices of A braces 62 erected on top of the body 10; the intermediate wings right and left from said body adjacent the top, and the lower wings right and left from said body adjacent the bottom thereof. The lower wings make a dihedral angle. Alined wing posts 63 interbrace the wings of the triplane structure. Said posts, together with posts 64 erected to interbrace the intermediate and upper planes, truss the triplane structure throughout. Cross arranged wires 65 are also used in the formation of this truss.

The empennage of the craft, comprising the usual vertical rudder 66, elevator flaps 67, vertical stabilizer 68 and horizontal stabilizer 69, is supported out from the body of the craft in the plane of the intermediate wings by spars 70 disposed symmetrically at opposite sides of the body 10, one spar extending rearwardly from each wing of the intermediate plane. Wires 71, 72 and 73 brace the empennage, the wires 71 interconnecting the spars and the upper planes, the wires 72 the spars and the lower plane, and the wires 73 the upper plane and the engine bed.

In addition to the main planes or triplane structure, auxiliary supporting planes or stub wings 74 extend out laterally from the engine section of the body. Said wings make a dihedral angle corresponding with the dihedral angle of the lower wings of the triplane structure. This arrangement necessarily brings the resultant center of aeroplane lift somewhat forward so as to lie properly in the approximate transverse vertical plane of the center of gravity CG. The use of auxiliary planes or stub wings 74 is necessary in view of the forwardly disposed motor.

The wing beams of the intermediate and lower wings of the triplane structure are built intimately into the sedan body. Beams 75 constitute the foundation for the intermediate wings and extend intermediately across said body so as to rest upon the upper longerons 11 to which the beams are fastened as indicated at 76. The beams of the lower wings, designated 77, extend intermediately through said body adjacent the bottom thereof, preferably between the intermediate and lower longerons. Braces 78 truss the forward beams 77 of the lower wings radially (see Fig. 6). Moreover, said beams 77 support bearings for the shaft 39. The beams of the stub wings 74, while they do not extend through the body of the craft, are founded directly upon the engine bed beams 18, sockets 79 being provided for that purpose. To increase the strength said stub wings are braced as indicated at 80, to the landing gear.

For increased longitudinal stability during land travel, the machine is equipped with longitudinally spaced, and independently acting pairs of landing gear wheels. The forward pair of wheels underlie the motor and the stub wings and the aft pair underlie the lower plane of the triplane structure. Said stub wings and the wings of the said lower plane thus function conjointly as mud guards. Appropriate landing gear struts 81 of substantially U-form (the extensions of each strut being streamlined as a unit) mount the rear landing gear wheels 82, an axle 83 of course being provided. Shock absorber elastics (not shown) support the axle 83 to cushion the impact of landing. The struts 81 of the rear portion 82 of the landing gear are fastened by any suitable means directly to the lower longerons 13 of the body, the point of fastening lying preferably in the vertical plane of the beams 77 of the lower wings to increase strength. Braces 84, with this in view, are interposed between the lower longerons 13 and the forward beams of the lower wings.

Like the rear landing gear wheels, the forward landing gear wheels 85 are mounted on an axle 86 movable relatively to supporting struts 87 of substantially U-form. The extensions of these struts 87 are streamlined as a unit and fastened directly to the engine bed beams 18 adjacent the forward end thereof. Shock absorber elastics (not shown) are to be provided in this connection also. For road or ground use the front landing gear wheels are equipped with steering knuckles 88 (see Fig. 8) and the knuckles connected by a rod 89 for simultaneous movement. Ears 90 are formed on the rod 89 adjacent its opposite ends to which control leads 91 are fastened. These leads extend inwardly from the respective ears 90 to engage with pulleys 92, being cross arranged, and thence extend rearwardly and slightly upwardly for connection (see Fig. 4) to a bar 93 rigidly united by means of a pivot pin 94 to the foot bar 95 of the control mechanism. This bar 95 is mounted in advance of the pilot's seat 34 beneath the covering 50 and is of sufficient length to extend laterally through openings 96 beyond the sides of the housing. The rudder leads 97 for operating the vertical rudder 66 are also fastened to the bar 93. By this arrangement the steering wheels and the rudder 66 are moved oppositely and in unison. Lateral balance of the craft is obtained through manipulation of trailing edge ailerons 98 mounted respectively adjacent the tips of the upper and intermediate planes. Said ailerons are interconnected as at 99 and controlled by manipulation of aileron leads 100 arranged to follow the upper plane inwardly to the body of the craft and thence forwardly to the control wheel 101. The control is of the Deperdussin type and comprises in addition to the wheel 101 a column 102 and column support 103, the column being oscillatable fore and aft to operate the elevator control leads 104. With a view to safety a tail skid 105 may be provided at the outer end of the tail structure beneath the empennage. The propeller 106 operates between the rearwardly extending spars 70 aft of the body 10, hence the machine is of the pusher type.

An aeroplane characterized as herein set forth possesses individuality and advantages heretofore unattained. If desired, the supporting surfaces and the tail structure may be shed as a unit and the machine thereafter operated as an air driven land craft or automobile. By constructing the sedan body after the fashion disclosed the head resistance incident to flight is minimized and the equipment of the craft fully protected against the elements. Furthermore, the arrangement of the supporting planes is such that access may be had to the interior of the sedan body without contact with said planes.

Although I have described more or less precise forms and details of construction, I do not intend to be understood as limiting myself thereto as I contemplate changes in form, the proportion of parts and the substitution of equivalents as circumstances may suggest or render expedient and without departing from the spirit of the invention as claimed.

What is claimed is:

1. In an airplane, a body, a motor inclosed within the body at or near its forward end, a pusher propeller, a propeller shaft likewise inclosed within the body, the longitudinal horizontal plane of its axis being vertically removed from the corresponding plane of the fore and aft axis of the motor, seats inclosed within the body, that portion of the body inclosing the seats being deeper and wider than that portion inclosing the motor, a shaft projecting rearwardly from the motor beneath the seats, the shaft being inclosed within the body, and transmission means interconnecting the last mentioned shaft and the propeller shaft, the transmission means being also inclosed within the body.

2. In an airplane, a body, supporting surfaces, a motor inclosed within the body at or near its forward end, a pusher propeller, an outrigged tail structure carried by the supporting surfaces, a propeller shaft inclosed within the body, the longitudinal horizontal plane of the axis of the propeller shaft being vertically removed from the corresponding plane of the fore and aft axis of the motor, seats for occupants inclosed within the body, that portion of the body in which the seats are arranged being deeper and wider than that portion of the body inclosed in the motor, a shaft projecting rearwardly from the motor beneath the seats, the shaft being inclosed within the body, and transmission means interconnecting the last mentioned shaft and the propeller shaft, the transmission means being also inclosed within the body aft of the seats.

3. In an airplane, a body, a motor inclosed within the body at or near its forward end, a pusher propeller, a propeller shaft inclosed within the body, the longitudinal horizontal plane of the axis of the propeller shaft being vertically removed from the corresponding plane of the fore and aft axis of the motor, seats for occupants inclosed within the body, a shaft projecting rearwardly from the motor beneath the seats, the shaft being inclosed within the body, a fuel tank inclosed within the body and situated directly above the seats, and transmission means interconnecting the last mentioned shaft and the propeller shaft, the transmission means being inclosed within the body and situated aft of the seats.

4. In an aeroplane, a body comprising a skeleton framework of substantially constant depth throughout a portion of its length, the remaining portion of its length being characterized by depth considerably less than the depth of said first mentioned portion, a motor inclosed in that portion of said body having minimum depth, seats inclosed in that portion of said body having maximum depth, a pusher propeller mounted in a plane above that of the motor, and a driving connection rearwardly extending from the motor to the propeller, said connection lying closely adjacent the bottom of the body to a point aft of the seats, from which point it extends upwardly to the propeller; said connection throughout its full length being completely inclosed in said body.

5. In an airplane, a body, supporting surfaces arranged to project out laterally from the body, a motor inclosed within the body at or near its forward end, a pusher propeller, an outrigged tail structure carried by the supporting surfaces, the said structure including spars arranged respectively at opposite sides of the propeller, a propeller shaft extended into the body, the longitudinal horizontal plane of the axis of the propeller shaft being vertically removed from the corresponding plane of the fore and aft axis of the motor, seats for occupants inclosed within the body, a shaft projecting rearwardly from the motor, the shaft being inclosed within the body, and transmission means interconnecting the last mentioned shaft and the propeller shaft, the transmission means being inclosed within the body and situated directly to the rear of that portion of the body within which the seats are arranged.

6. In an aeroplane, a body comprising a skeleton framework interiorly divided into compartments, a motor inclosed in the foremost compartment of said body, seats inclosed in one of the compartments aft of the foremost compartment, a pusher propeller, and a driving connection between the motor and propeller, said connection being inclosed for its major part in one of the compartments aft of the seat compartment although extended for a portion of its length beneath said compartment containing said seats.

7. In an aeroplane, an inclosed body, seats arranged respectively in tandem and at opposite sides of the fore and aft axis of said body, a motor, a pusher propeller, and transmission means inclosed within said body for rearward extension from said motor beneath said seats.

8. An aeroplane body comprising a plurality of pairs of longerons, the uppermost pair of longerons terminating forwardly short of the lower pair of longerons and the pair of longerons next adjacent thereto, and means diagonally interconnecting the upper pair of longerons and the pair of longerons next adjacent the bottom pair.

9. An aeroplane body comprising three pairs of longerons, the intermediate pair of longerons terminating forwardly in substantially the vertical plane of the forward end of the lower longerons and rearwardly in substantially the vertical plane of the rear end of the upper longerons, said upper longerons and said lower longerons terminating respectively, and at opposite ends, short of the intermediate longerons for the production of a sedan type body of stream line form.

10. An aeroplane body comprising a plurality of superposed pairs of longerons horizontally bowed and rearwardly tapered for intersection at the after end of said body, the lower longerons terminating rearwardly short of the upper longerons and short of the longerons next adjacent thereto, and means continuing said lower longerons rearwardly and upwardly for the interconnection of the several superposed pairs of longerons.

11. An aeroplane body of the sedan type comprising three pairs of longerons superposed, the intermediate and lower pairs of longerons terminating forwardly beyond the vertical plane of the corresponding end of the upper longerons, means diagonally interconnecting the intermediate and the upper longerons, and an engine bed mounted to extend forwardly beyond the plane of the forward end of the lower longerons, the horizontal plane of the engine bed underlying the horizontal plane of the intermediate longerons.

12. In an aeroplane, a body, seats inclosed in the intermediate portion of said body, a motor inclosed in the forward portion of said body, a fuel tank inclosed within said body above the seat containing compartment thereof, a pusher propeller, and transmission means completely inclosed within said body, said transmission means being principally inclosed within said body aft of the seat containing compartment thereof.

13. In an aeroplane, a body, including an intermediately located seat containing compartment, a forwardly located engine section, and a rearwardly located third compartment, a propeller shaft inclosed within said third compartment, a motor inclosed within the engine section of said body, a pusher propeller, and transmission means inclosed partly within said third compartment and partly beneath said intermediate compartment.

14. In an airplane, a body, the body in cross section increasing in size from a point at or near its forward end to a point of maximum cross sectional area nearer its rear end than its forward end, the cross sectional area of the body from its point of maximum cross section decreasing rather abruptly to a substantially vertical knife-edge of a depth approximately equal to the maximum depth of the body, a motor inclosed within the body at or near its forward end and within that portion of the body characterized by minimum depth and cross sectional area, seats inclosed within the body at or near its point of maximum cross sectional area, a pusher propeller, a shaft projecting rearwardly from the motor beneath the seats, the shaft being inclosed within the body, a propeller shaft, and transmission means inclosed within that portion of the body aft of its point of maximum cross sectional area, the transmission means affording a connection between the propeller shaft and the shaft projecting rearwardly from the motor.

15. In an aeroplane, a body having its forward end reduced in cross sectional area to provide an engine section, a pusher propeller, a motor inclosed in said engine section, a driving connection between the motor and the propeller, longitudinally separated pairs of landing gear wheels mounted respectively beneath said engine section and that portion of the body of the maximum cross sectional area, principal supporting surfaces arranged to extend out right and left from said body directly above the rearmost landing gear wheels, and auxiliary supporting surfaces of relatively small area arranged to extend out right and left from the engine section directly above the forward landing gear wheels.

In testimony whereof I hereunto affix my signature.

GLENN H. CURTISS.